(12) United States Patent
Bouchet

(10) Patent No.: US 6,983,390 B2
(45) Date of Patent: Jan. 3, 2006

(54) METHOD AND SYSTEM FOR SAVING THE LOCAL CLOCK OF A DATA PROCESSING AREA

(75) Inventor: Alain Bouchet, Villiers-Adam (FR)

(73) Assignee: Bull, S.A., Louveciennes (FR)

( * ) Notice: Subject to any disclaimer, the term of this patent is extended or adjusted under 35 U.S.C. 154(b) by 359 days.

(21) Appl. No.: 10/325,858

(22) Filed: Dec. 23, 2002

(65) Prior Publication Data

US 2003/0135780 A1 Jul. 17, 2003

(30) Foreign Application Priority Data

Dec. 24, 2001 (FR) .................................. 01 16833

(51) Int. Cl.
*G06F 1/12* (2006.01)

(52) U.S. Cl. .................................... 713/375; 713/600

(58) Field of Classification Search ................ 713/375, 713/400, 401, 500, 502, 600
See application file for complete search history.

(56) References Cited

U.S. PATENT DOCUMENTS

| | | | |
|---|---|---|---|
| 5,261,118 A * | 11/1993 | Vanderspool et al. ....... | 455/503 |
| 5,579,513 A * | 11/1996 | Strohmer .................... | 713/600 |
| 6,223,228 B1 | 4/2001 | Ryan et al. | |
| 6,535,926 B1 * | 3/2003 | Esker ......................... | 709/248 |
| 6,659,861 B1 * | 12/2003 | Faris et al. ................... | 463/1 |
| 2003/0140050 A1 * | 7/2003 | Li et al. ..................... | 707/100 |

FOREIGN PATENT DOCUMENTS

FR 2 767 935 A 3/1999

\* cited by examiner

*Primary Examiner*—Dennis M. Butler
(74) *Attorney, Agent, or Firm*—Miles & Stockbridge, P.C.; Edward J. Kondracki

(57) ABSTRACT

A method and a system for saving the local clock of a data processing area of a multicellular platform, configured from a management tool as a data processing server on a partitionable machine.

For the management tool and each data processing area, an absolute reference clock is established. For each area comprising a local clock managing an operating activity, there is calculated and stored a backup attribute containing at least one time shift parameter of the parameters for management of the local time with respect to the absolute reference clock. For the subsequent execution of the operating activity on a successive different data processing area, parameters for management of the time of this activity with respect to the absolute reference clock are recalculated. The successive local clock, associated with the successive different data processing area is updated, prior to the launching of the operating activity to continue execution.

20 Claims, 5 Drawing Sheets

Local updating

METHOD AND SYSTEM FOR SAVING THE LOCAL CLOCK OF A DATA PROCESSING AREA

BACKGROUND OF THE INVENTION

1. Field of the Invention

The invention concerns a method and a system for saving the local clock of a data processing area or zone, configured on a multicellular platform of data processing resources.

2. Description of the Related Background

At the present moment, one of the axes of development of data processing equipment and/or systems concerns the implementation of a maximum flexibility of configurable data processing resources, for the benefit of a user having available, locally, significantly reduced data processing resources.

In the present configurable or reconfigurable data processing systems, as illustrated in FIG. 1a, a multicellular platform PF of data processing resources is used which can be configured from a management tool MT, by a user, so as to constitute a data processing area Pi formed by a given number of cells, each cell $C_{kj}$ comprising at least one central processing unit, working memories, and a local physical component capable of delivering a local clock signal. Each data processing area is managed by a specific multiprocessor operating system and may consequently be configured by the user with a view to executing an operating activity. In general, an operating activity corresponds to an application requiring a specific computing power according to the type and volume of data processed by this application.

More particularly, it should be remembered that the management tool may advantageously be constituted by a micro-computer connected in a local network, extended to the multicellular platform.

Finally, common resources, such as peripheral elements, mass memory, of the system disk type, may be associated with the cellular platform.

Such systems correspond to systems or machines, customarily designated as partition machines, and normally make it possible to install and execute different operating activities in the different partitions of the platform. Nevertheless, when such an installation is carried out, it is not generally possible to transfer an installation into another partition without reinstallation or physical manipulation while additionally preserving the context of execution of the aforesaid operating activity.

With regard to the existing mechanisms, permitting the dynamic repetition of operating activities of one data processing system by another data processing system, equipped with the same operating system, such mechanisms essentially utilise two systems which must imperatively synchronise their context of execution and which share only their data disks and not their system disk.

Finally, the static mechanisms for operating activity repetition require either the reinstallation of an equivalent system or, if required, the physical transfer from system disk to an equivalent system, or even the recabling of the accesses to the disk of the system replaced to an equivalent replacement system.

OBJECT OF THE INVENTION

The objective of the present invention is to remedy all of the aforesaid drawbacks of the solutions proposed by the known prior art.

In general terms, an objective of the present invention is the implementation of a totally flexible partition machine, by means of which an operating activity, installed and executed on a constituent partition of a current data processing area configured on a multicellular platform, can be reloaded and rebooted in another data processing area, while preserving the essential environment parameters of that operating activity, in the absence of any physical intervention.

In particular, an object of the present invention is the implementation of processes of reloading and rebooting of any operating activity from one data processing area to another data processing area of a multicellular platform, independently and with full transparency with respect to the operating system used.

More specifically, an object of the present invention is the implementation of a method and a system for saving the local clock of a data processing area configured as a partition of a multicellular platform of data processing resources, in order to permit the preservation of the essential environment parameters of any operating activity executed on that data processing area, then on any different data processing area configured on this multicellular platform.

BRIEF SUMMARY OF THE INVENTION

The method for saving the local clock of a data processing area configured on a multicellular platform of data processing resources within the framework of an operating activity applies to a platform in which each data processing area is managed by a specific operating system and that can be configured by a user from a management tool, with a view to executing the operating activity on at least one current data processing area or on successive different data processing areas.

It is remarkable in that it consists in establishing an absolute reference clock for the whole constituted by the management tool and by all the configurable data processing areas on this multicellular platform.

For each current data processing area, configured at the request of a user, and with which there is associated a current local clock making it possible to manage an operating activity from the operating system, it further consists in calculating and storing, for each operating activity in the course of execution on this current data processing area of the multicellular platform, a backup attribute containing, in addition to the parameters for management of the time of this operating activity, with reference to the current local clock, a time shift parameter of the parameters for management of the time with respect to the absolute reference clock.

During the reloading of the operating activity to continue execution on a successive data processing area, different from the current data processing area and with which there is associated a successive local clock, different from the current local clock associated with the current data processing area, it consists in recalculating the parameters for management of the time of the operating activity starting from the time shift parameter of the parameters for management of the time with respect to the absolute reference clock, and in updating the successive different local clock associated with this successive different data processing area, prior to the launching of said operating activity to continue execution.

The method of the present invention can be applied to network data processing technology, and in particular to the implementation of data processing servers supporting partitions usable simultaneously and successively by different operations or operating activities, and also to the implementation of data processing servers having great flexibility and availability of use between data processing servers, making it possible to transfer without difficulty and a complex operation an operating activity from one data processing server to another data processing server.

BRIEF DESCRIPTION OF THE SEVERAL VIEWS OF THE DRAWINGS

It will be understood more clearly on reading the description and observing the appended drawings in which, in addition to FIG. 1a and FIG. 1b which illustrate a partitionable machine on a multicellular platform of the prior art.

DETAILED DESCRIPTION OF THE INVENTION

A more detailed description of the method for saving the local clock of a data processing area configured on a multicellular platform of data processing resources, in accordance with the objects of the present invention, will now be given in conjunction with FIGS. 1a, 1b and with the following figures.

Prior to the actual description of the method of the present invention, reminders will be given relative to the configuration and to the operating mode of data processing areas configured on a multicellular platform of data processing resources.

Figure 1A:
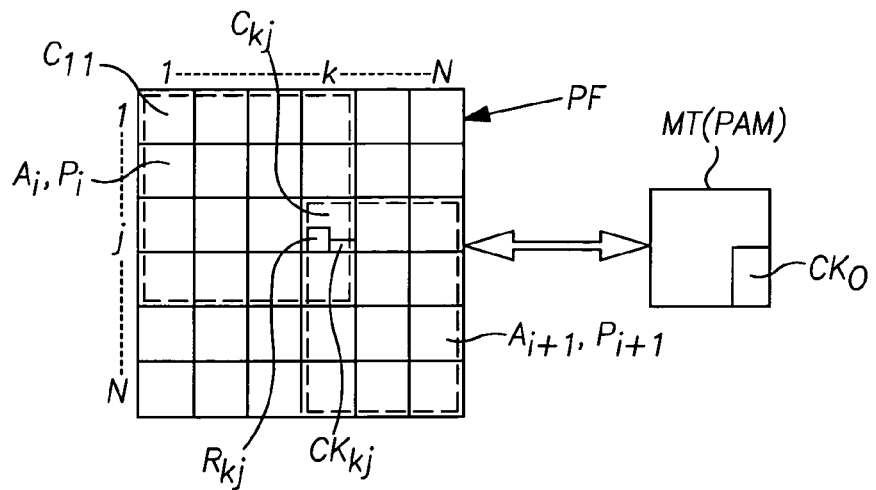

With reference to FIG. 1a, it should be remembered that the present multicellular platforms may be constituted by physical platforms in accordance with the Intel IA-64 architecture for example.

In general terms, with reference to the aforesaid figure, it should be remembered that these multicellular platforms are constituted by cells designated by $C_{kj}$, with k and j varying from 1 to N for example.

Such platforms in fact make it possible to configure different data processing areas $P_i$, it being possible to associate with each data processing area $P_i$ an operating system $OS_i$ for example. Each operating system $OS_i$ then perceives its data processing area $P_i$ as a platform independent of the size of the area $P_i$.

The operating systems $OS_i$ may be different, their selection being based on technical imperatives, according to the operating activity being considered, or on criteria formulated by the user.

Each cell $C_{kj}$ has available elementary data processing resources such as, in particular, resources designated by $R_{kj}$ that can correspond to elements in memory, input/output elements or the like, and also, of course, to a clock circuit designated by $CK_{kj}$.

In general terms, a user is in a position to configure an area $P_i$ for the execution of an application or operating activity designated by $A_i$, the data processing area $P_i$ consisting of a plurality of cells such as those defined for example in FIG. 1a.

It is envisaged, in particular, that the user is in a position to configure one or more data processing areas simultaneously on the platform PF being considered, as represented in FIG. 1a, the data processing area $P_{i+1}$ permitting the execution for example of an operating activity $A_{i+1}$ for example different from the operating activity $A_i$. These operations of configuration and partition of the multicellular platform may be executed by means of a management tool designated by MT, itself equipped with data processing resources, and connected in a network to the platform PF.

In general terms, with each data processing area $P_i$ there is associated a local clock constituted by one of the clocks $CK_{kj}$ of the constituent cells of this area $P_i$.

When, of course, the data processing areas $P_i$ and $P_{i+1}$ are caused to function simultaneously, the aforesaid areas are disjointed. Thus, with reference to FIG. 1a, it is understood that the local clock of the area $P_i$ is constituted by the clock and the clock circuits equipping the cell $C_{kj}$ for example.

Finally, it is indicated that the management tool MT is constituted by a software assembly executed by a computer system comprising, for example, a central unit $UC_o$, a working memory RAM and a clock $CK_o$, the whole being designated by Platform Administration and Maintainability Software or PAM, as mentioned in FIG. 1a.

It is thus understood that there can be associated with each area $P_i$ an operating system $OS_i$ for the execution of an application $A_i$.

In general terms, the aforesaid operating systems $OS_i$ make it possible to access the resources of the platform and in particular of the data processing area $P_i$ through standard interfaces, the interfaces in general using either direct access or access by way of the software BIOS, for Basic Input Output Software, to the local physical resources $R_{kj}$ mentioned previously.

Figure 1B:
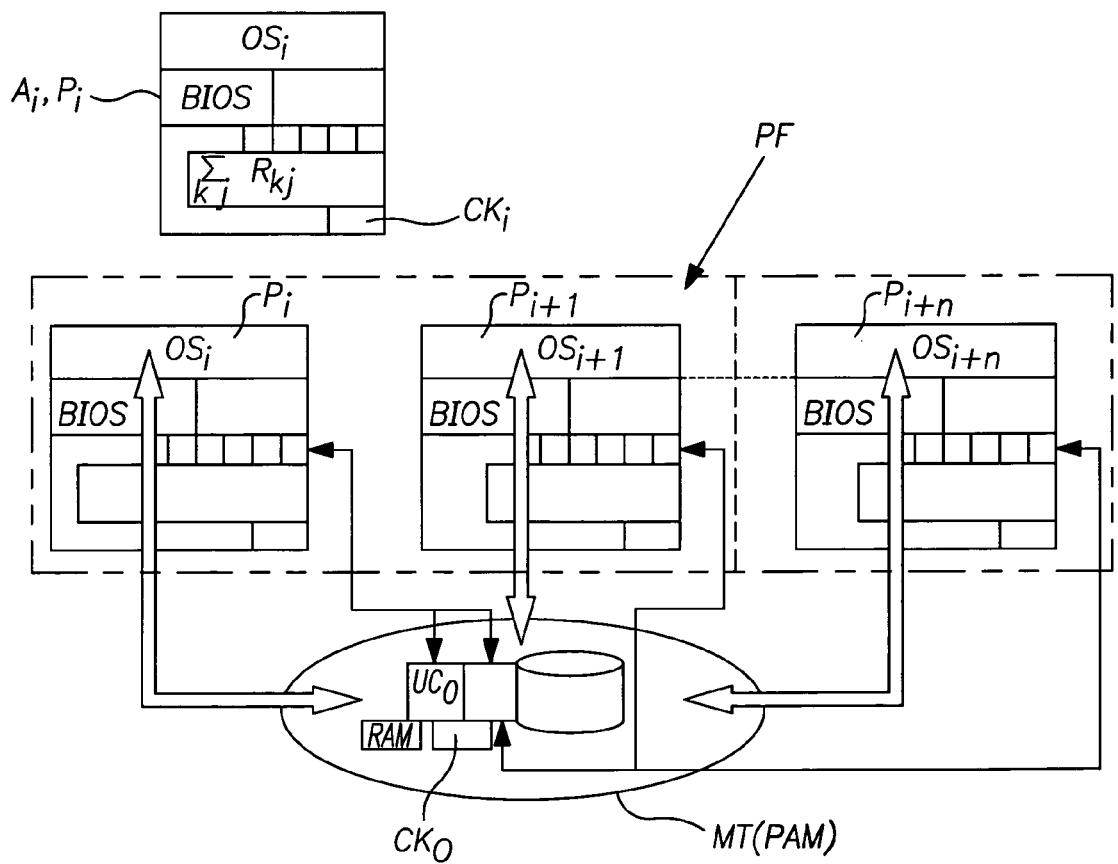

For this reason, in FIG. 1b, a data processing area $P_i$ has been shown which permits the execution of an operating activity $A_i$ by way of an operating system $OS_i$, for which area the whole of the resources of the area is designated by $\Sigma_{kj} R_{kj}$ where this notation designates the whole of the resources accessible by way of the operating system $OS_i$ for the data processing area $P_i$ being considered, there being additionally associated with this area a clock referred to as local clock $Ck_i$ corresponding for example to one of the clocks of the constituent cells of the area $P_i$.

For the implementation of the method of the present invention, and in order to facilitate the implementation of the latter, the interfaces for access to the local resources are served either directly, or by way of the BIOS, owing to the use of the management tool MT.

The corresponding architecture makes it possible, as shown in FIG. 1b, to intercept the access of the operating systems to the resources of the platform PF, it being possible for the different areas $P_i$, $P_{i+1}$, to $P_{i+n}$ to be implemented on different parts of the platform from similar or different operating systems, designated, for this reason, by $OS_i$, $OS_{i+1}$ to $OS_{i+n}$.

It is further understood that, according to a particularly remarkable feature of the method of the present invention, the user may also configure each data processing area $P_i$ so that the successive areas overlap for example, each area $P_i$ to $P_{i+1}$ being able to include for example common resources, that is to say common cells $C_{kj}$, each area then being used in succession for the successive execution of the same application $A_i$ for example.

It is of course understood that, in such a situation in particular, the management tool MT itself includes data processing resources and, of course, a clock designated by $CK_0$ in FIG. 1b.

The objective of the method of the present invention is to permit the direct passage from a data processing area $P_i$ to a different data processing area $P_{i+1}$ and in succession to successive different areas for the execution of the same application $A_i$ by successive passes thanks to different data processing areas.

The method of the present invention will now be described in conjunction with FIG. 2a in the context mentioned previously.

With reference to the aforesaid figure, it is indicated that the method of the present invention permits the execution of an operating activity $A_i$ on at least one current data processing area designated by $P_i$ or on different successive data processing areas designated as $P_{i+1}$ to $P_{i+n}$ in FIG 1b.

Figure 2A:
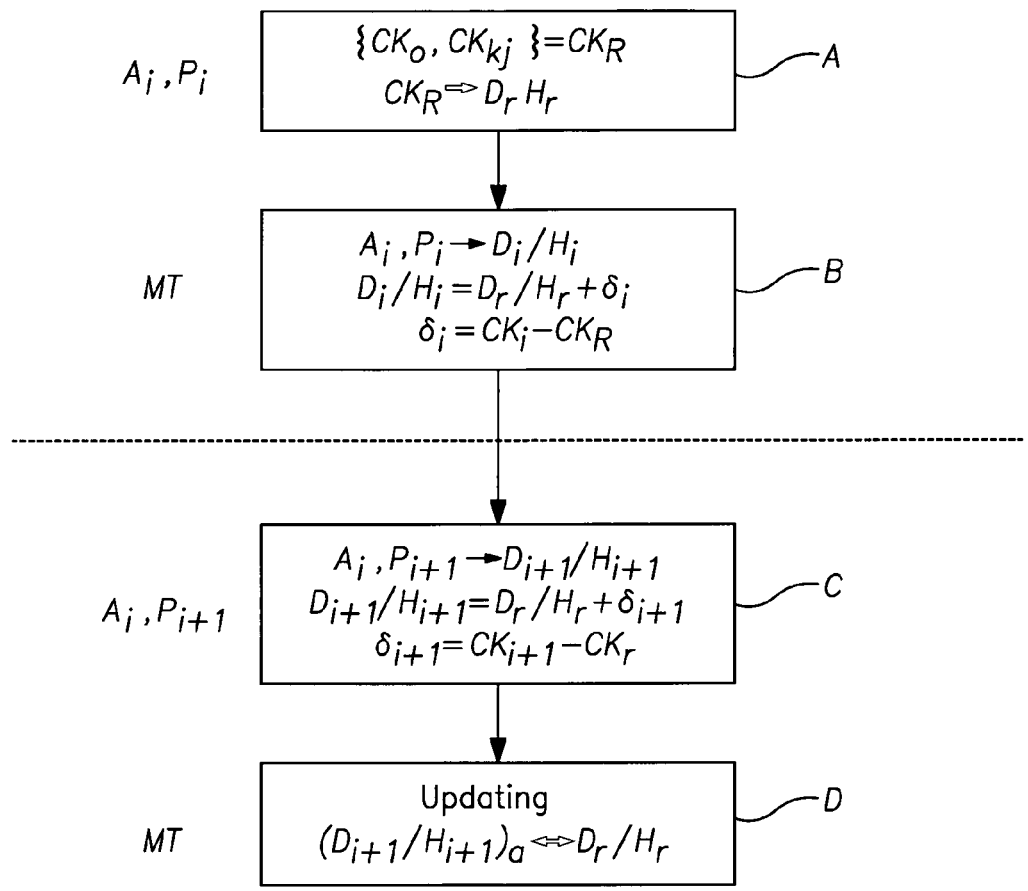
FIG. 2a shows, by way of illustration, a general flow chart for the implementation of the method of the present invention.

Moreover, with reference to FIG. 2a, the method of the invention consists, in a step A, in establishing an absolute reference clock for the whole constituted by the management tool MT and by all the configurable data processing areas on the multicellular platform.

In step A of FIG. 2a, this operation is represented by the relationship:

$$\{CK_0, CK_{kj}\} = CK_R.$$

By this relationship, it is indicated that the method of the present invention, in step A, consists in selecting, from all the local clocks which are present on the platform PF and, in particular, at the level of each cell $C_{kj}$, and also from the clock $CK_0$ of the management tool, a clock referred to as reference clock $CK_R$ making it possible to deliver absolute reference clock signals.

In general terms, it is indicated that the absolute reference clock $CK_R$ makes it possible to deliver time data in the form of reference date $D_r$ and reference time $H_r$, these reference time data being designated by $D_r/H_r$.

For each current data processing area, configured at the request of a user, with which there is associated a current local clock making it possible to manage an operating activity from the operating system associated with this current area, the method of the invention then consists, in step B, in calculating and storing, for each operating activity in the course of execution on this current data processing area of the multicellular platform PF, a backup attribute containing, in addition to the parameters for management of the time of the operating activity, and with reference to the current local clock delivering signals $D_i/H_i$ corresponding to date and time signals with reference to the current local clock, a time shift parameter designated by $\delta_i$, this parameter representing the shifting of the parameters for management of the time of the local clock with respect to the absolute reference clock.

Figure 2B:
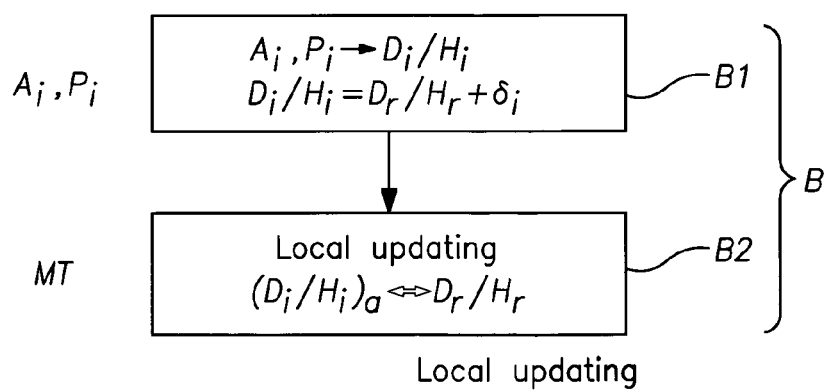
FIG. 2b shows, by way of illustration, a specific, non-limiting detail of implementation of one of the steps of implementation of the method of the invention shown in FIG. 2a, FIG. 2c shows, by way of illustration, a specific process of implementation of the method of the invention, during voluntary modification of the date and/or time parameters by the user.

In step B of FIG. 2b, there is thus noted the relationship:

$$D_i/H_i = D_r/H_r + \delta_i$$

with:

$$\delta_i = Ck_i - CK_R.$$

It is understood, in particular, that the time shift parameter $\delta_i$ is an algebraic parameter in advance or delayed with respect to the absolute reference clock.

By way of non-limiting example, it should be remembered that the values of local date $D_i$ and absolute reference date $D_r$ may advantageously be expressed in the form of: years YY, months MM, and days DD.

Similarly, the parameters of local time $H_i$ and absolute reference time $H_r$ may advantageously be expressed in the form of: hours, minutes, seconds and hundredths of a second, if necessary.

When, after stoppage of the execution of the operating activity $A_i$ by the user, the latter proceeds to reload the same operating activity $A_i$ on a successive different area $P_{i+1}$ with a view to continuing execution of the same operating activity $A_i$, these operations executed by the user being represented by the dotted line in FIG. 2a, a different local clock is, of course, necessarily associated with the following different area $P_{i+1}$, which, moreover, may be managed by an operating system $OS_{i+1}$ different from the preceding operating system $OS_i$.

Under these conditions, the method of the present invention consists, in a step C, in recalculating the parameters for management of the time of the operating activity starting from the time shift parameter of the parameters for management of the time with respect to the absolute reference clock.

In step C, the date parameters of the data processing area $P_{i+1}$ are designated by $D_{i+1}/H_{i+1}$, the local clock $CK_{i+1}$ being the local clock associated with the successive data processing area $P_{i+1}$.

In step C, the parameters for management of date and time for the area $P_{i+1}$ are then calculated according to the relationship:

$$D_{i+1}/H_{i+1} = D_r/H_r + \delta_{i+1}.$$

As in the case of the operation carried out in step B, the time shift verifies the relationship:

$$\delta_{i+1} = CK_{i+1} - CK_r.$$

Step C is then followed by a step D consisting in updating the following local clock $CK_{i+1}$ associated with the following different data processing area $P_{i+1}$ prior to the launching of the operating activity $A_i$ to continue execution of the latter.

In step D, the updating operation is represented by the relationship:

$$(D_{i+1}/H_{i+1})_a \Leftrightarrow D_r/H_r.$$

Through the aforesaid updating operation, represented by the double arrow, it is understood that this operation amounts to compensating any deviation of each operating activity $A_i$ and executed on the current data processing area then on the successive different data processing area $P_{i+1}$.

In order to simplify the implementation of the method of the present invention, the latter may consist, in step B, of carrying out the re-setting of the current local clock associated with the current area $P_i$ so as to compensate for the time shift $\delta_i$ during the execution of the operating activity $A_i$ on the current data processing area $P_i$.

In FIG. 2b, this operation is carried out by way of a sub-step B1 consisting, of course, in calculating the time shift $\delta_i$ in relation to the local reference clock, this operation in sub-step B1 being designated as:

$$D_i/H_i = D_r/H_r + \delta_i.$$

The sub-step B1 is then followed by a sub-step B2 consisting in carrying out local updating at the level of the area $P_i$ in the form verifying the relationship:

$$D_i/H_i \Leftrightarrow D_r/H_r.$$

this operation amounting to setting the local clock to the absolute reference clock.

Under these conditions, the operation C may then be executed normally for the following different data processing area $P_{i+1}$ and the operation D then consists in carrying out updating on the basis of the sole shift of the following different local clock, the value $\delta_i$ having been zeroed for the preceding local clock of the current data processing area $P_i$.

With regard to the selection of the local clock of each current data processing area $P_i$, then of each successive different data processing area $P_{i+1}$ to $P_{i+n}$, it is indicated that several possibilities may be envisaged.

According to a first possibility, the absolute reference clock may be constituted by a specific local physical component having an address belonging to the multicellular platform. In this situation, the method of the present invention may consist in reserving one of the cells of the multicellular platform PF of specific address so as to reserve the local physical component of the aforesaid cell and to attribute thereto the function of absolute reference clock. Such a choice is possible, but it has the drawback, however, of particularising one of the cells $C_{kj}$ of the platform PF and, finally, of imposing one or more inputs/outputs and exchanges of messages between the management tool MT and the platform PF in order to obtain the absolute clock data $D_r/H_r$.

According to a preferred choice of implementation of the method of the present invention, the absolute reference clock may advantageously be constituted by a local physical component belonging to the management tool.

Under these conditions, it is understood, of course, that the local component is none other than the clock $CK_0$ equipping the physical resources of the management tool MT.

This second solution appears preferable with respect to the preceding solution in so far as, since the absolute reference clock is an integral part of the management tool MT, it is no longer necessary to reserve the resources of a specific cell of the platform PF on the one hand, while on the other hand the absolute reference clock and the corresponding signals are directly available at the level of the management tool MT.

Finally, the method of the invention makes it possible, of course, to take into account any local modification of date and/or time which might be introduced voluntarily by the user during the execution of an operating activity $A_i$ on a corresponding data processing area $P_i$.

Such operations of change of date and/or time are frequent and allow any user to use a local time which is arbitrary or, at the very least, capable of corresponding to specific operating imperatives.

For the implementation of the method of the present invention during voluntary local modification of date or time by the user, it is considered that the updating of the following different local clock, associated with the successive different data processing area $P_{i+1}$, has been carried out if necessary, in accordance with step D in FIG. 2a and step B of the same figure or, if required and preferably, in accordance with the implementation of step B according to FIG. 2b.

Under these conditions, it is indicated that the voluntary change of date and/or time is thus taken into account for any current data processing area $P_i$ whether this is configured by the user during a first implementation of the application $A_i$ or, if required, during subsequent implementations.

Figure 2C:
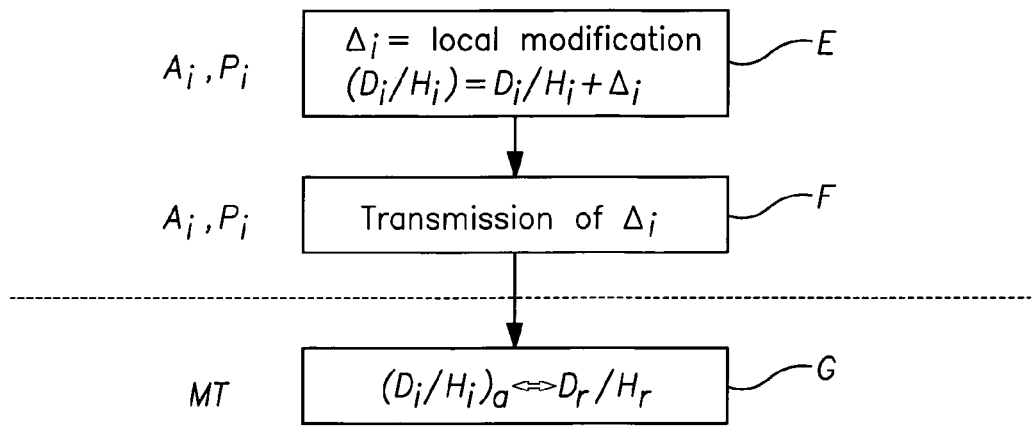

Under these conditions, the method of the present invention consists, as shown in FIG. 2c, in modifying the current local clock by a value corresponding to the modification introduced, this modification being designated by $\Delta_i$.

The operation of modification of the current local clock verifies the relationship:

$$-(D_i/H_i) = D_i/H_i + \Delta_i.$$

Step E is then followed by a step F consisting in transmitting the value of the local modification of date and time $\Delta_i$ to the management tool MT. The modification is requested of the BIOS by the operating system $OS_i$ managing the execution of the operating activity $A_i$. The BIOS notifies the management tool MT of the request.

On receipt of the aforesaid value of local modification of date and time, the method of the invention consists, in step G, in bringing up to date the time shift parameter of the parameters for management of the time with respect to the absolute reference clock and the aforesaid backup attribute. This operation verifies the relationship:

$$(D_i/H_i)_a \Leftrightarrow D_r/H_r.$$

This operation in fact designates the compensation of the date and time parameters and the setting of the corresponding values to the date and time values of the reference clock, as mentioned previously in the description.

Means for specific implementation of the method of the present invention will now be described in conjunction with FIGS. 3a to 3c, then 3d and 3e for the operations carried out during changes of the current data processing area $P_i$ to a subsequent different data processing area $P_{i+1}$ respectively a voluntary change of date and time carried out by the user, during the execution of an operating activity $A_i$ on a current data processing area $P_i$.

Figure 3A:
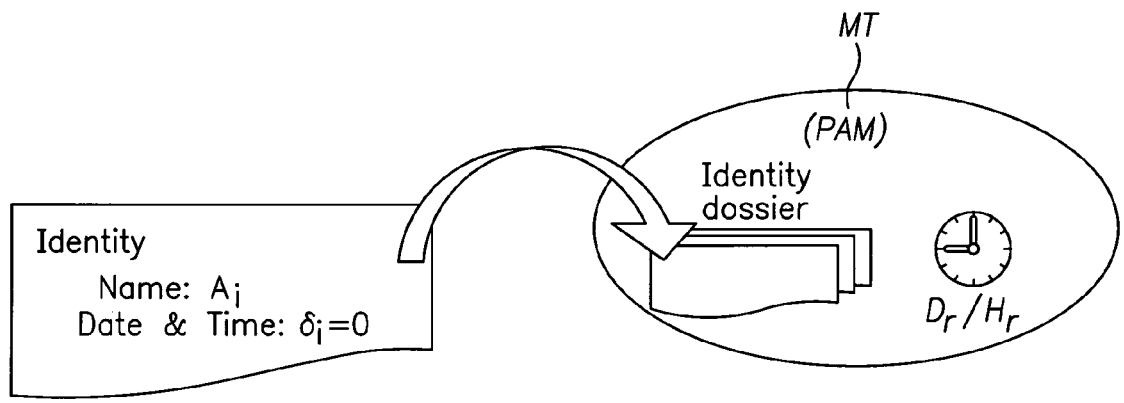
FIGS. 3a to 3e show, by way of illustration, specific modes of implementation of the steps of the method of the invention, as shown in FIG. 2a, during the introduction of modifications of a current data processing area to a successive different data processing area by a user, during the course of an operation of execution of an operating activity by the latter.

FIG. 3a shows the operations carried out during the creation of the operating activity $A_i$.

The management tool MT and, in particular, the corresponding PAM software, bring about the creation of an identity type data object or file dedicated to the aforesaid operating activity $A_i$. This file may advantageously include, as shown in FIG. 3a, the name of the operating activity $A_i$ and also a default time shift parameter $\delta_i$ established at the value zero relative to the reference clock $D_r/H_r$. The management tool MT can then bring together a plurality of identity dossiers or identity files corresponding to different activities.

Figure 3B:
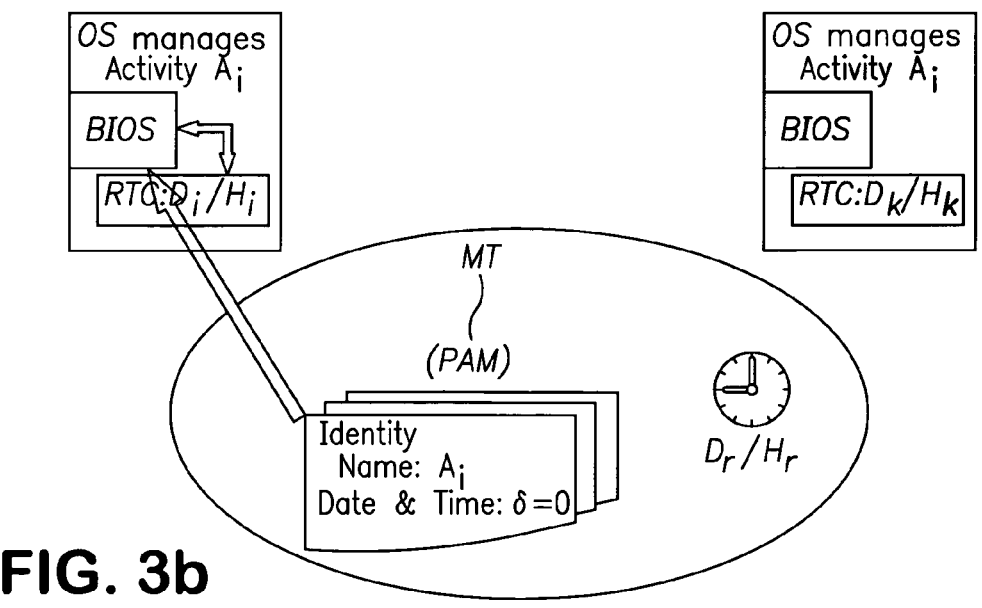

FIG. 3b shows the process of loading the operating activity $A_i$ on the data processing area $P_i$ defined by the user.

At the moment of initialisation of the aforesaid area $P_i$, the management tool MT then calculates the effective value of the time shift $\delta_i$ according to the relationship shown in step B of FIG. 2a, or, if required, according to step B1 of FIG. 2b.

The management tool MT transmits the data necessary for bringing up to date the local clock of the clock component RTC of the area $P_i$ by way of the BIOS. This operation is then carried out according to step B2 in FIG. 2b.

The BIOS software then carries out the updating according to the relationship of step B2 in FIG. 2b before handing over to the operating system $OS_i$ under which the operating activity $A_i$ is executed.

Figure 3C:
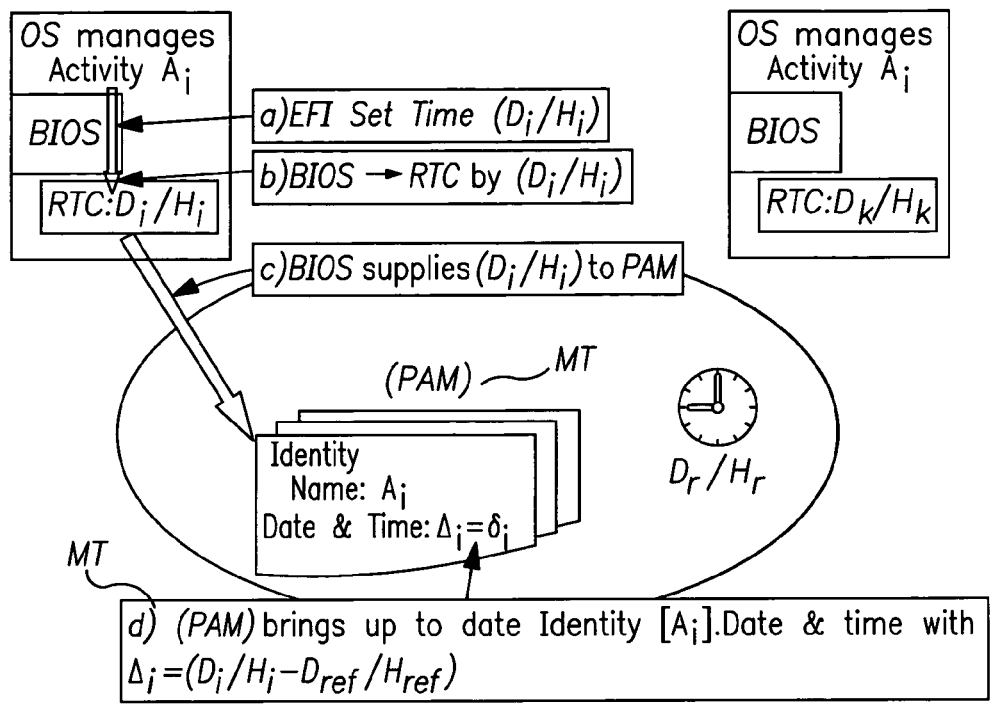

FIG. 3c shows the operations carried out during the introduction of a modification of date and/or time by the user of the operating activity $A_i$, as shown in FIG. 2c.

Firstly, the user of the operating activity $A_i$ requests the modification of the parameters for management of the current time $D_i/H_i$.

The Set Time method of the interface EFI of the BIOS is then called with the parameters of the request for modification of date and/or time.

The BIOS software of the data processing area $P_i$ brings up to date the local clock component CKi of the IT area $P_i$ and transmits to the management tool MT the parameters of the modification request.

The management tool MT and, in particular, the PAM software module of the latter, then recalculate the difference corresponding to the modification $\Delta_i$ and verifying the relationship:

$$\Delta_i = D_i/H_i - D_r/H_r$$

between the new date and time parameter arising from the modification and the reference time and brings up to date the date and time attribute of the identity object, the name of which corresponds to the activity $A_i$.

Figure 3D:
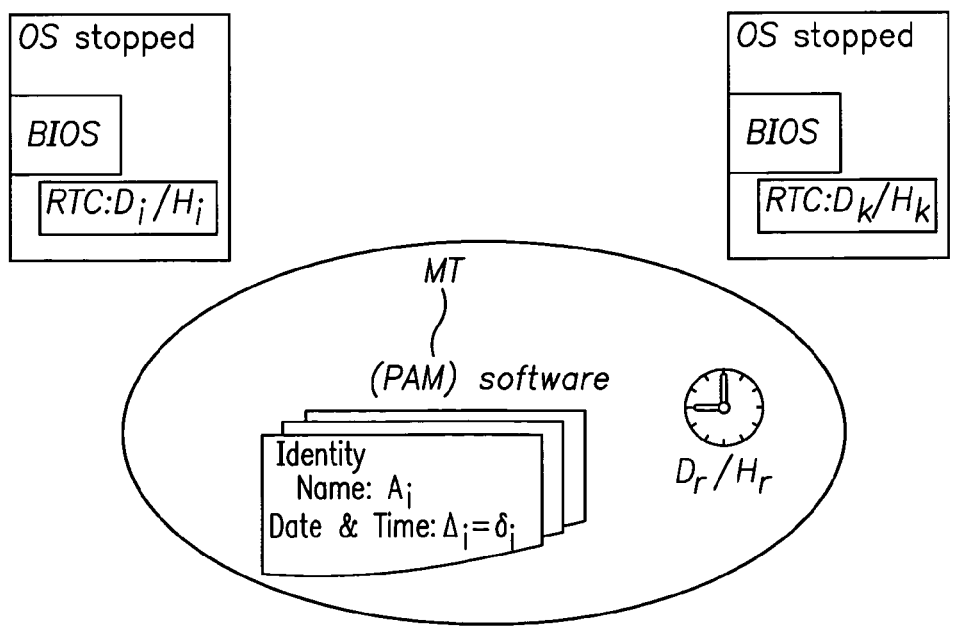

FIG. 3d shows the operations executed during the stoppage of execution of an operating activity on a current data processing area $P_i$ previously executing an operating activity $A_i$.

With reference to the aforesaid FIG. 3d, when such an activity is stopped and in fact it frees the data processing area $P_i$ used, the identity object is saved by the management tool MT.

Figure 3E:
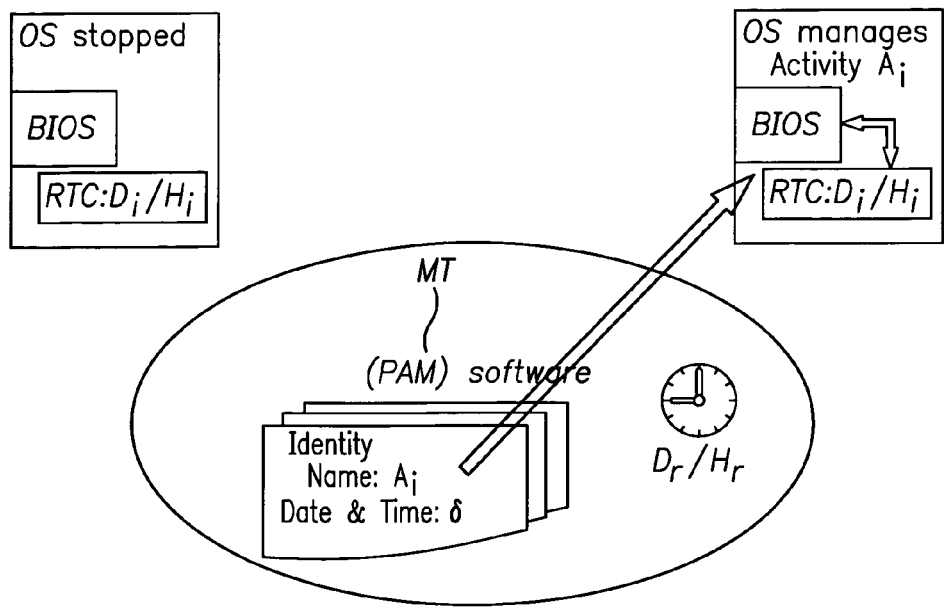

FIG. 3e shows the loading of the preceding operating activity $A_i$ on a new data processing area $P_{i+1}$.

The processing carried out in this situation is then identical to the operations carried out and described during the loading of the activity $A_i$ on the data processing area $P_i$ shown in FIG. 3b. However, within the framework of FIG. 3e, the operations are this time carried out by way of the BIOS of the data processing area $P_{i+1}$. Finally, the activity $A_i$ has changed area while preserving, however, the time and date modification carried out on the preceding area, as described previously in conjunction with FIG. 3b or FIG. 3c when it is a voluntary modification.

Figure 4:
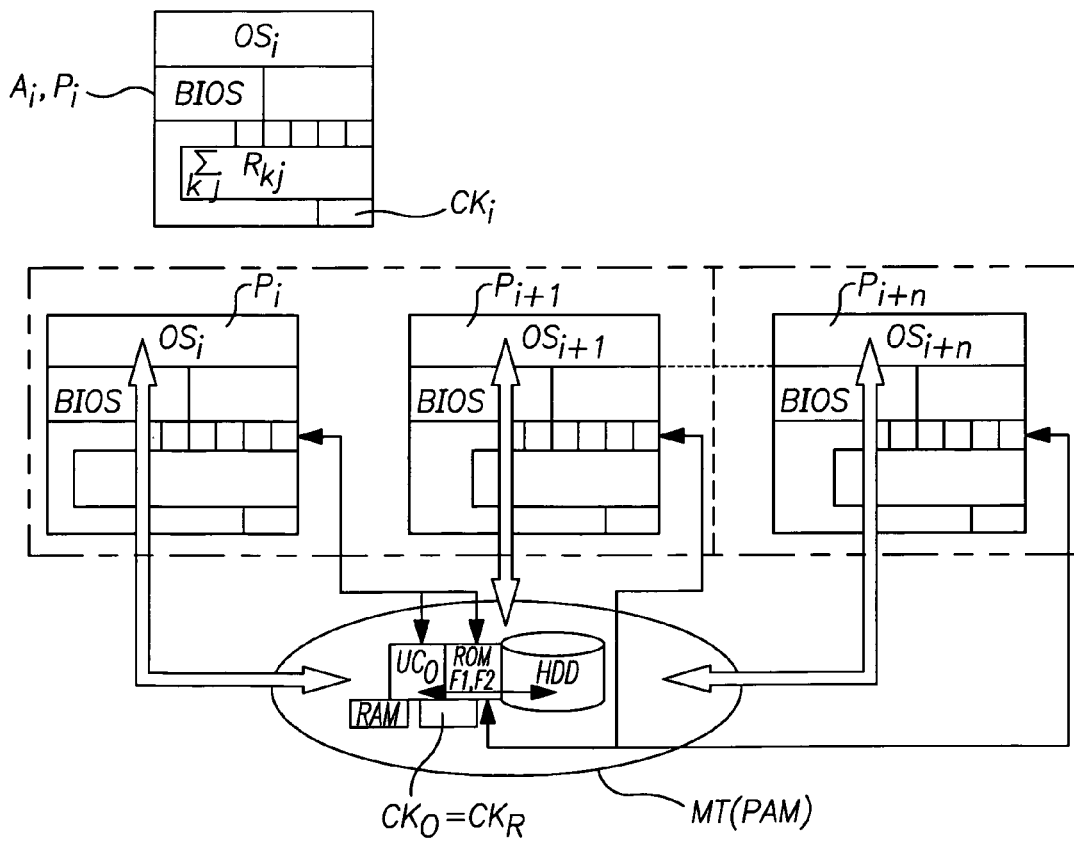
FIG. 4 shows a system for protecting the local clock of a data processing area, in accordance with the object of the present invention.

Finally, with reference to FIG. 4, it is indicated that a system for protecting the local clock of a data processing area, in accordance with the object of the present invention, comprises, in particular, an absolute reference clock circuit designated by $CK_R$, it being possible to select this circuit from one of the clock circuits equipping the multicellular platform PF or, preferably, as shown in FIG. 4, the constituent computer of the management tool MT.

In addition, the system of the invention is remarkable in that the management tool MT includes, implanted in permanent memory of the computer, that is to say, either in a ROM memory, or on the hard disk thereof, a module for computation of a backup attribute containing, in addition to the parameters for management of the time of the operating activity $A_i$ with reference to the local clock $CK_i$, a time shift parameter of the parameters for management of the time with respect to the absolute reference clock $CK_R$.

It is understood, in particular, that the aforesaid computation module may be constituted by a program stored in the form of a file on the hard disk or, if required, in read only memory ROM and loaded on initialisation of the management tool MT. This module is therefore constituted by a software module designated by $F_1$ in FIG. 4.

In addition, a module for bringing up to date the local clock $CK_i$ of any partition $P_i$ is also provided, in accordance with the relationships given previously in the description for the implementation of the method of the present invention. This module is represented by a file $F_2$ in FIG. 4, which is also loaded into the central memory of the computer on initialisation.

Preferably, the protection attribute is constituted in the form of an identity file including at least the name of the operating activity $A_i$ and the time value associated with this operating activity, for the data processing area $P_i$ being considered.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method for saving a local clock of a data processing area configured on a multicellular platform of data processing resources within the framework of an operating activity, each data processing area being managed by a specific operating system and being configurable and able to be configured by a user from a management tool (PAM) with a view to the execution of said operating activity on at least one current data processing area or on different successive data processing areas, said method comprising the steps of:

a) establishing an absolute reference clock for the management tool and by all the configurable data processing areas on said multicellular platform; and, for each current data processing area configured at the request of a user and to which there is associated a current local clock making it possible to manage an operating activity from said operating system, b) calculating and storing, for each operating activity being executed on the current data processing area of said multicellular platform, a backup attribute containing, in addition to the parameters for management of the time of said operating activity, with reference to said current local clock, a time shift parameters of said parameters for management of the time with respect to said absolute reference clock; and, during a subsequent reloading of said operating activity to continue execution on a successive data processing area different from the current data processing area and with which there is associated a successive local clock different from the current local clock associated with the current data processing area, c) recalculating the parameters for management of the time of said operating activity starting from said time shift parameter of the parameters for management of the time with respect to said absolute reference clock; and d) updating said successive different local clock associated with said successive different data processing area, prior to the launching of said operating activity to continue execution.

2. The method of claim 1, wherein said absolute reference clock is constituted by a local physical component having a specific address and belonging to said multicellular platform.

3. The method of claim 2 wherein the operations of bringing up to date or updating are carried out by way of BIOS software associated with the operating system of each data processing area.

4. The method of claim 2 wherein upon a modification of the parameters for management of the time of said operating activity by a user in the course of at least partial execution of said operating activity on said current data processing area, said method further comprises:
 e) updating the current local clock by a value corresponding to said modification;
 f) transmitting conjointly said modification to said management tool; and, following this transmission,
 g) bringing up to date said time shift parameter of said parameters for management of the time with respect to said absolute reference clock and said backup attribute.

5. The method of claim 4 wherein each backup attribute includes at least:
 an identifier of said operating activity; and
 a shift parameter of date, hours, minutes, seconds, and hundredths of a seconds.

6. The method of claim 4 wherein the operations of bringing up to date or updating are carried out by way of BIOS software associated with the operating system of each data processing area.

7. The method of claim 1, wherein said absolute reference clock is constituted by a local physical component belonging to said management tool.

8. The method of claim 7 wherein the operations of bringing up to date or updating are carried out by way of BIOS software associated with the operating system of each data processing area.

9. The method of claim 7 wherein upon a modification of the parameters for management of the time of said operating activity by a user in the course of at least partial execution of operation activity on said current data processing area, said method further comprises:
 e) updating the current local clock by a value corresponding to said modification;
 f) transmitting conjointly said modification to said management tool; and , following this transmission,
 g) bringing to date said time shift parameter of said parameters for management of the time with respect to said absolute reference clock and said backup attribute.

10. The method of claim 9 wherein each backup attribute includes at least:
 an identifier of said operating activity; and
 a shift parameter of date, hours, minutes, seconds, and hundredths of a seconds.

11. The method of claim 9 wherein the operations of bringing up to date or updating are carried out by way of BIOS software associated with the operating system of each data processing area.

12. The method of claim 1, wherein upon a modification of the parameters for management of the time of said operating activity by a user in the course of at least partial execution of said operating activity on said current data processing area, said method further comprises:
 e) updating the current local clock by a value corresponding to said modification;
 f) transmitting conjointly said modification to said management tool; and , following this transmission,
 g) bringing to date said time shift parameter of said parameters for management of the time with respect to said absolute reference clock and said backup attribute.

13. The method of claim 1, wherein each backup attribute includes at least:
 an identifier of said operating activity; and
 a shift parameter of date, hours, minutes, seconds, and hundredths of a seconds.

14. The method of claim 1, wherein the operations of bringing up to date or updating are carried out by way of the BIOS software associated with the operating system of each data processing area.

15. A system for saving a local clock of a data processing area, said data processing area being configured for the execution of an operating activity in a partition of a multicellular platform from a management tool interconnected through a network to said multicellular platform, each data processing area including a local clock circuit constituted by the clock circuit of a constituent data processing cell of said data processing area and said management tool being constituted by a computer equipped with a specific clock circuit, wherein said system comprises:
 an absolute reference clock circuit, selected from one of the clock circuits equipping said multicellular platform of the specific clock circuit of said computer;
 said management tool including, implanted in permanent memory of said computer, a module for computation of a backup attribute containing, in addition to parameters for management of the time of said operating activity with reference to said local clock, a time shift parameter of the parameters for management of the time with respect to said absolute reference clock; and
 a module for bringing up to date the local clock of any constituent partition of a configurable data processing area on said multicellular platform.

16. The system of claim 15, wherein said absolute reference clock circuit is the specific clock circuit of said computer.

17. The system of claim 16 wherein said backup attribute is constituted in the form of an identity file including at least the name of said operating activity and the value of the time shift associated with said operating activity for the data processing area being considered.

18. The system of claim 15, wherein said backup attribute is constituted in the form of an identity file including at least the name of said operating activity and the value of the time shift associated with said operating activity for the data processing area being considered.

19. The system of claim 18 wherein the computation module comprises a stored program loaded on initialisation of the management tool.

20. The system of claim 15, wherein the computation module comprises a stored program loaded on initialisation of the management tool.

* * * * *